United States Patent [19]

MacDonald et al.

[11] Patent Number: 5,111,286
[45] Date of Patent: May 5, 1992

[54] IMAGE PROCESSING

[75] Inventors: Lindsay W. MacDonald, Bedfordshire; Richard A. Kirk, Hertfordshire, both of England

[73] Assignee: Crosfield Electronics Ltd., England

[21] Appl. No.: 660,085

[22] Filed: Feb. 25, 1991

[30] Foreign Application Priority Data

Feb. 23, 1990 [GB] United Kingdom ............... 9004121

[51] Int. Cl.$^5$ .............................................. H04N 1/46
[52] U.S. Cl. ................................................... 358/75
[58] Field of Search ...................... 358/75, 80, 461, 76, 358/81

[56] References Cited

U.S. PATENT DOCUMENTS

| 4,941,039 | 7/1990 | E'Errico | 358/75 |
| 5,031,035 | 7/1991 | Abe | 358/80 |
| 5,053,867 | 10/1991 | Yamamato et al. | 358/75 |

FOREIGN PATENT DOCUMENTS

| 188098 | 7/1986 | European Pat. Off. |
| 310388 | 4/1989 | European Pat. Off. |
| 8303941 | 11/1983 | PCT Int'l Appl. |

Primary Examiner—Stephen Brinich
Attorney, Agent, or Firm—Sughrue, Mion, Zinn, Macpeak & Seas

[57] ABSTRACT

Apparatus for interactively modifying an image represented by digital data defining the color content of pixels in the image in terms of color components defining a first color space comprises a store (1) for storing the original image; a look-up table (2) for transforming the image into a second color space (LCH) and a store (3) for storing the second color space representation. The second color space is defined by second color components having a reduced resolution relative to those of the first color space. The representation in the second color space is fed through a look-up table (4) whose contents can be controlled by an operator so that the image at low color resolution can be retouched interactively, the retouch version being displayed on a monitor (6). Once a satisfactory retouch has been achieved, the original image in the store (1) is modified and stored in the first color space in a store (13).

In another application of the invention, a control data array such as a mask can be generated from the low color resolution image stored in the store (3).

17 Claims, 2 Drawing Sheets

IMAGE PROCESSING

FIELD OF THE INVENTION

The invention relates to methods and apparatus for generating control data arrays and for interactively modifying an image.

DESCRIPTION OF THE PRIOR ART

In conventional digital processing of high quality images, each pixel of an image is typically represented by digital data values defining the density of respective colour components of the pixel, each density being represented by 8 binary digits (bits). This leads to a minimum of 24 bits being required to represent each pixel value in a three colour system such as red, green and blue. Commonly 32 bits are used to represent cyan, magenta, yellow, and black in graphics arts applications. One of the problems introduced via this type of representation, however, is the time taken to modify the image interactively or to generate a colour selective mask due to the volume of data involved. In the case of image retouching, we have previously proposed two approaches to improve this situation.

EP-A-0188098 describes a method in which an image is represented by a limited palette of colours which is determined by generating a histogram of colours present in the image and then selecting the most commonly occuring colours, following which all the colours in the image are coded in terms of the most commonly occurring colours. Although this can speed up the retouching process by reducing the number of bits stored for each pixel, it suffers from the problem that a new colour palette must be set up differently for each image thus increasing the preparatory processing time. The method also suffers from a number of other problems.

U.S. Pat. No. 4,598,282 describes a method in which an image represented by printing colour components (cyan, magenta, yellow and black) is converted into monitor colour components (red, green and blue) and retouching is performed in the monitor colour space until a satisfactory image is achieved when the modifications are converted into equivalent printing format colour component modifications to modify the original image representation. This suffers from the disadvantage that due to the differences in gamut between the printing format and monitor format colour components and the non-linearities in the overprinting of the inks, the method is only effective for neutral colours.

SUMMARY OF THE INVENTION

In accordance with one aspect of the present invention, a method of generating a control data array from an image represented by digital data defining the colour content of pixels of the image in terms of first colour components defining a first colour space comprises;

a) transforming the image into a second colour space different from the first colour space wherein each pixel is defined by second colour components having a reduced resolution relative to those of the first colour space;

b) generating from the reduced resolution version of the image an array of control data having a value corresponding to each image pixel, the control values being generated from the reduced resolution image values in accordance with a predetermined algorithm.

In accordance with a second aspect of the present invention, apparatus for generating a control data array from an image represented by digital data defining the colour content of pixels of the image in terms of first colour components defining a first colour space comprises first transform means for transforming the image into a second colour space different from the first colour space wherein each pixel is defined by second colour components having a reduced resolution relative to those of the first colour space; and means for generating from the reduced resolution version of the image an array of control data having a value corresponding to each image pixel, the control values being generated from the reduced resolution image values in accordance with a predetermined algorithm.

We have realised that a control data array, for example a mask, can be generated much more quickly than has hitherto been possible due to the reduced number of colours involved.

Typically, the control data values will be stored although this is not essential.

Preferably, the method further comprises displaying the image on a monitor by mixing a special colour with the image in the second colour space in accordance with the control data. This enables the control data array to be generated interactively very easily.

The predetermined algorithm may comprise a simple thresholding operation but the method is particularly suitable where the predetermined algorithm comprises generating a control value in accordance with the relationship between each pixel value of the reduced resolution version of the image and a target colour. An example of such a technique is described in EP91300862.9.

In accordance with a third aspect of the present invention, a method of interactively modifying an image represented by digital data defining the colour content of pixels of the image in terms of first colour components defining a first colour space comprises;

a) transforming the image into a second colour space different from the first colour space, the second colour space spanning the entire perceptual colour range, wherein each pixel is defined by second colour components having a reduced resolution relative to those of the first colour space;

b) modifying the representation of the image in the second colour space and displaying the modified image;

c) repeating step b until a satisfactory image is obtained; and thereafter, d) generating a final representation of the image in the first colour space by using the final modification in the second colour space determined in step b.

In accordance with a fourth aspect of the present invention, apparatus for interactively modifying an image represented by digital data defining the colour content of pixels of the image in terms of first colour components defining a first colour space comprises first transform means for transforming the image into a second colour space, the second colour space spanning the entire perceptual colour range, wherein each pixel is defined by second colour components having a reduced resolution relative to those of the first colour space; an input device to enable an operator to modify the representation of the image in the second colour space; a monitor for displaying the modified image; and means for generating a final representation of the image in the first colour space by using the final modification applied to the representation of the image in the second colour space.

This invention can thus be extended to image retouching with which it is particularly useful since the retouching can be performed interactively at high speed.

Thus, a 24 or 32 bit image may be represented using a restricted palette of less than $2^{24}$ or $2^{32}$ colours. Provided the errors have been propagated the number of colours can be reduced to $2^{16}$ or $2^8$ without seriously harming the image. Once this has been done mask values, or new colour look-up values, for the image may be looked up very rapidly. The nett transform to the restricted palette plus look-ups can be performed faster than the original calculations leading to rapid interactive processing.

Preferably, the method further comprises modifying the contents of a first look up table having addresses corresponding to all possible pixel values in the second colour space; and causing the representation of the image in the second colour space to address the first look-up table.

In all the aspects of the invention, a representation of the image in a second colour space is generated which, particularly in the case of colour retouching, will usually be different from the original and display colour spaces. It has recently be found that an operator can more readily modify an image if he can modify perceptual retouch colours which are found to correspond most closely with the lightness, colourfulness and hue (LCH) attributes of the human visual system. This colour space is different from that of the printing inks (CMYK) and that of the display monitor (RGB) and is much better for colour correction purposes. It should also be noted that by converting the image to this perceptual colour space, modifications to the image can be achieved for all functions of LCH and not just for colours near to the neutral (i.e. lightness) axis. Furthermore, it should be noted that the reduced resolution, second colour space is not created from the most commonly occuring colours in the image being processed but is determined independently as a fixed set of colours selected to span the entire perceptual colour range. This palette would be constant for every image and so there would be no need to perform a separate histogram analysis for each image.

As mentioned above, typically the second colour space will represent lightness, colourfulness and hue while the first colour space will represent printing ink colours (for example cyan, magenta, yellow and black) while the third colour space will represent monitor format colours such as red, green, and blue.

Typically, the colour components of the second colour space will be represented by values requiring half the number of binary digits to represent them compared with the colour components of the first colour space. For example, if the first colour space requires a 32 bit representation (8 bits for each colour component) then the second colour space would require only 16 bits.

The first transform means could in theory comprise a look-up table having addresses corresponding to each of the possible colours of the image in the first colour space and containing values at each address corresponding to the equivalent colour in the second colour space. In practice, this would mean having a look-up table with about 4 billion entries, which would be prohibitively expensive. Some alternative, cheaper, method would therefore normally be used, such as using the most significant 4 bits from each input colour to address a much smaller lookup table and then using the least significant 4 bits from each input colour to interpolate amongst the nearest entries in the table.

Similarly, the second transform means preferably comprises a look-up table having addresses corresponding to each of the colours in the second colour space and containing values corresponding to the equivalent colours in the third colour space, the look-up table being connected to the input device to enable the contents of the table to be changed.

The apparatus can be implemented by a suitably programmed computer or using hardware circuits.

BRIEF DESCRIPTION OF THE DRAWINGS

Some examples of methods and apparatus according to the invention will now be described with reference to the accompanying drawings in which:

EMBODIMENT

Figure 1:
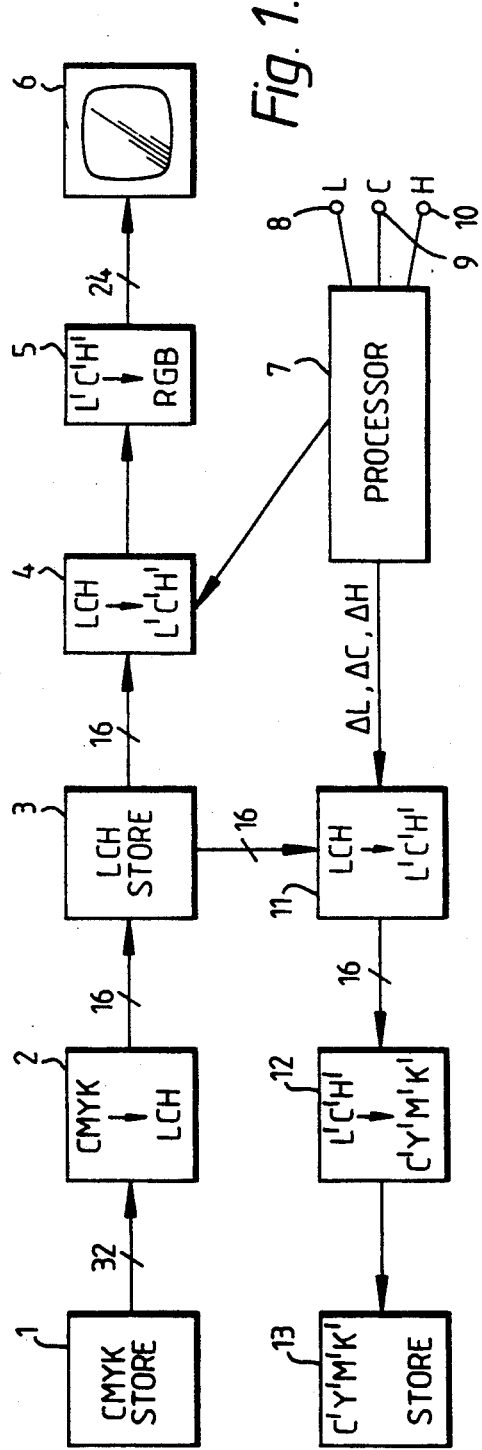
Figure 3:
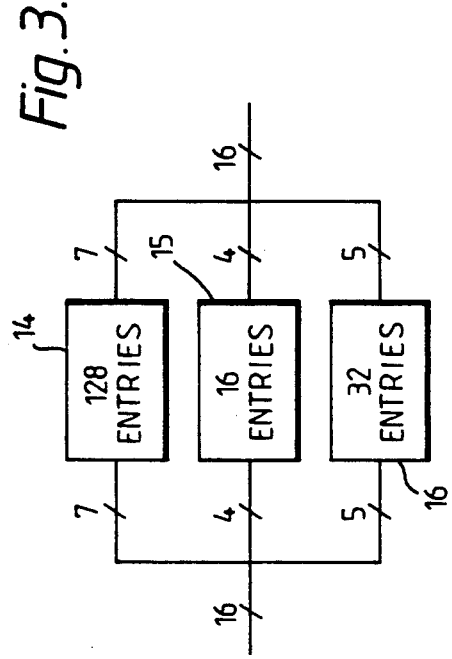
Figure 2:
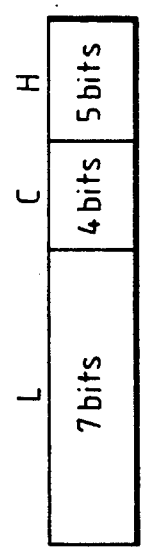
Figure 4:
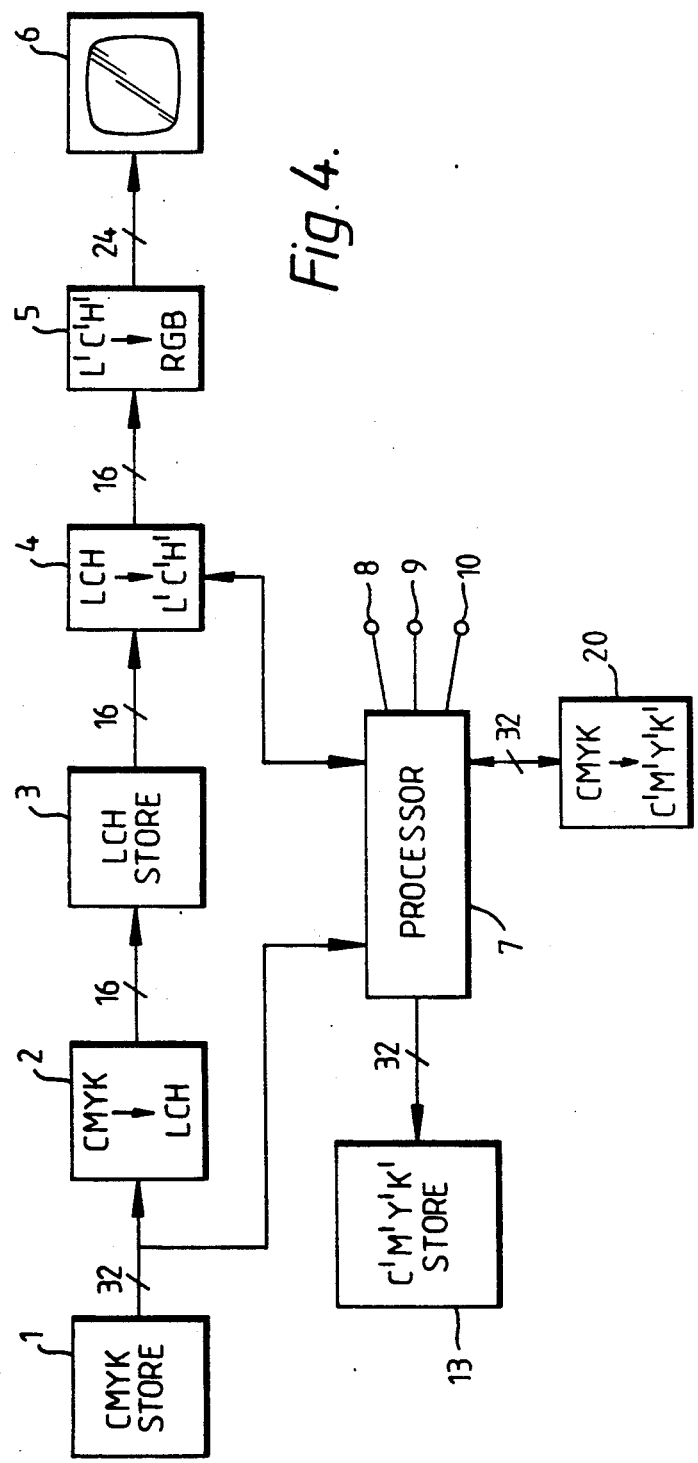

FIG. 1 is a schematic block diagram of one example;

FIG. 2 shows how a pixel colour is represented in LCH colour space;

FIG. 3 illustrates one of the look-up tables of FIG. 1 in more detail;

FIG. 4 is a schematic block diagram of a second example; and

Figure 5:
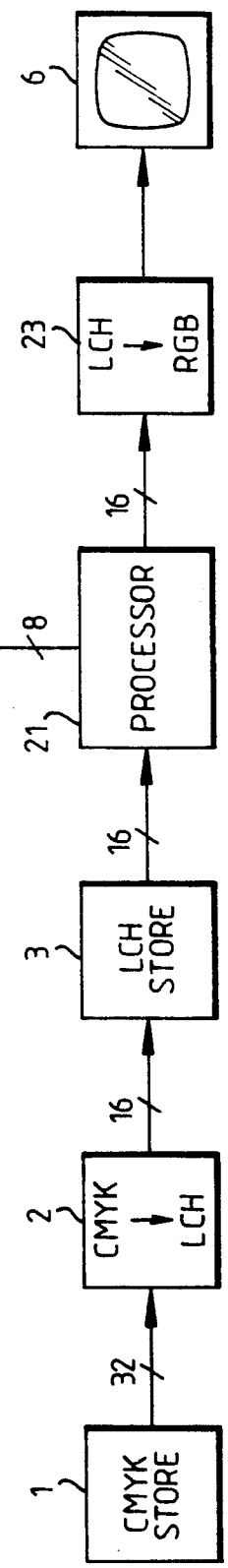

FIG. 5 is a schematic block diagram of a third example.

The original image, represented by printing format colour components (CMYK) is stored in a store 1. Each colour component is represented by 8 bits with the result that each pixel is represented by a 32 bit value. The 32 bit pixel values are converted from CMYK to the second colour space, lightness, colourfulness and hue (LCH) in a conventional manner by a look-up table (LUT) 2 or other processing means, the result of the conversion being stored in a frame store 3. It will be noted that the number of bits per pixel has been reduced from 32 to 16 and this may be achieved by representing the lightness component by 7 bits, the colourfulness component by 4 bits, and the hue component by 5 bits as shown in FIG. 2. An example of an algorithm for converting from CMYK to LCH is described in "The Reproduction of Colour (4th Edition)" by R. W. G. Hunt (published by Fountain Press, 1987).

The contents of the frame store 3 are then applied to a LUT 4 which has an address corresponding to each possible pixel value in terms of LCH, the content of the addresses initially being the same as the address so that the image is passed unchanged to a further LUT 5 which converts the LCH colour components to monitor format colour components: red, green, and blue, each of 8 bits, which are applied to a monitor 6 to enable the image to be displayed.

The contents of the LUT 4 can be changed under the control of a suitably programmed processor 7 which is responsive to operator controls 8-10 which enable the operator to modify the representation of the image. Where the operator is manipulating L, C, H controls independently then LUT 4 can be regarded as three independent one-dimensional tables 14-16 containing 128, 16 and 32 entries respectively, as shown in FIG. 3. Because there are so few entries to be calculated, the update speed can clearly be very fast, easily exceeding the frame refresh rate of the display monitor. In the more general case where the operator is manipulating L, C, H controls in an interdependent manner (for example, to change the colourfulness only of light green or yellow colours), there are only 2 addresses in the LUT 4, every modification achieved by the operator will be much more quickly performed than in a conventional system with the result that the image displayed on the monitor 6 will be rapidly updated with the current settings of the controls 8-10.

Once the operator has decied that the image displayed on the monitor 6 is acceptable, he notifies the processor 7 accordingly which feeds the final, resulting changes in the colour components to a further LUT 11 to which is also fed the values from the store 3. These values are then converted by the LUT 11 into final second colour space values L', C', H' which are fed to another LUT 12 which converts these final second colour space values to printing format or first colour space values C', Y', M', K' which are stored in a store 13.

Although the second colour space has been described as requiring a 16 bit representation, other numbers of bits in the representation are also possible.

There is a variety of ways in which the conversion performed by the LUT 2 can be performed. However, we have devised a particularly convenient method which will now be described.

Consider digitizing each axis of the first colour space to a certain number of bits. For each axis independently a small range of the colour value has been approximated to an integral digital value at its centre. In three dimensions this means that each small cubic region has been approximated to the point at its centre. This is a body-centred lattice of points in colour space.

Suppose instead that the last bit of one of the axes could be obtained by an exclusive OR of the least significant bits of the other two axes. Half of the points on the original body centred lattice have disappeared. If a double-size cube of eight of the original cubes is plotted out with the lattice point at the corner rather than the body centre, it can be seen that the new unit cube has points at the corners and the centres of the faces only: the points lie on a face-centred lattice. This lattice has the useful property that the maximum distance from any point to a lattice point in units of the lattice parameter is minimised—it is a close-packed lattice, a property it shared with the Hexagonal lattice. This means that it should be better suited to the sort of approximate represenatation required.

|  | Body-centred | Face-centred |
|---|---|---|
| % of space filled by sphere | 52% | 74% |
| Max dist to sphere centre | 1.73 R | 1.42 R |
| (R = radius of sphere) | | |

FIG. 4 illustrates a modification of the FIG. 1 example. The elements labelled 1-10 and 13 are the same as before but the manner in which the original image is stored in the store 1 is different. In this example, the LUT 4 which contains $2^{16}$ addresses is interpolated up to define a look-up table 20 having $2^{32}$ addresses and containing values defining colour components C', M', Y', and K' derived from the components L', C', H' in the LUT 4. In other words, the LCH addresses are interpolated up to a resolution of $2^{32}$ and corresponding interpolations are performed on the contents of those addresses as well as a conversion from LCH to CMYK in a conventional manner. The new LUT 20 is then used to convert the original data in the store 1 to the final data defined as C', M', Y', K' which is stored in the store 13. The examples of the invention described so far constitute interactive retouching techniques. FIG. 5 illustrates apparatus for generating a control data array or mask which will typically have eight bits per image pixel and will then be used in a subsequent processing operation for example to combine the image in the store 1 with another image. In this example, the image in the store 1 is fed via the LUT 2 to a store 3 as before. A processor 21 then accesses each pixel value in turn from the store 3 and applies this to a predetermined algorithm. In a simple case, the algorithm comprises a thresholding process in which the pixel value is compared with the threshold. If a pixel value exceeds the threshold then a control value "1" is generated while otherwise a control value "0" is generated. These values are then stored in a mask store 22. This will generate a so-called "hard" mask which can subsequently be used in a conventional manner. In a more sophisticated process the processor may apply an algorithm for generating a colour selective mask in which, for example, the pixel value accessed from the store 3 is compared with a target value and depending upon the difference between the two, a suitable control value in the range 0-255 is generated (a "soft" mask).

The apparatus of FIG. 5 enables the mask to be viewed on the monitor 6 under the control of the processor 21. In the case of a "soft" mask, the processor 21 combines the image from the store 3 with a special colour in proportions defined by the control value stored in the mask store 22. The resultant values are passed to a LUT 23 which converts the LCH values to monitor format RGB values to enable the resultant "image" to be displayed on the monitor 6 which will indicate the position and effect of the mask stored in the mask store 22.

It will be appreciated that by reducing the colour resolution, it is possible to achieve fast, interactive modification of the image when it is in the form of a low colour resolution form as compared with the much slower transformation process for transforming from the first to the second colour space.

We claim:

1. A method of generating a control data array from an image represented by digital data defining the colour content of pixels of the image in terms of first colour components defining a first colour space the method comprising
    a) transforming the image into a second colour space different from the first colour space wherein each pixel is defined by second colour components having a reduced resolution relative to those or the first colour space;
    b) generating from the reduced resolution version of the image an array of control data having a value corresponding to each image pixel, the control values being generated from the reduced resolution image values in accordance with a predetermined algorithm.

2. A method according to claim 1, further comprising storing the control data values.

3. A method according to claim 1, further comprising displaying the image on a monitor by mixing a special colour with the image in the second colour space in accordance with the control data.

4. A method according to claim 1, wherein the predetermined algorithm comprises generating a control value in accordance with the relationship between each pixel value of the reduced resolution version of the image and a target colour.

5. A method according to claim 4, wherein step (b) comprises modifying the contents of a first look up table having addresses corresponding to all possible pixel values in the second colour space; and causing the representation of the image in the second colour space to address the first look-up table.

6. A method according to claim 5, wherein step (d) comprises interpolating from the modified second colour space values a set of modified first colour space values, one for each possible first colour space value; and modifying the image by converting each original pixel value to the corresponding modified value.

7. A method according to claim 1, wherein the first and second colour spaces define different combinations of colour components.

8. A method according to claim 1, wherein the second colour space represents lightness, colourfulness and hue while the first colour space represents printing ink colour components.

9. A method according to claim 1, wherein the second colour space is represented by values requiring half the number of binary digits to represent them compared with the colour components of the first colour space.

10. A method of interactively modifying an image represented by digital data defining the colour content of pixels of the image in terms of first colour components defining a first colour space, the method comprising
   a) transforming the image into a second colour space different from the first colour space, the second colour space spanning the entire perceptual colour range, wherein each pixel is defined by second colour components having a reduced resolution relative to those of the first colour space;
   b) modifying the representation of the image in the second colour space and displaying the modified image;
   c) repeating step b until a satisfactory image is obtained; and thereafter,
   d) generating a final representation of the image in the first colour space by using the final modification in the second colour space determined in step b.

11. A method according to claim 10, wherein step (d) comprises transforming the final representation of the image in the second colour space into the first colour space.

12. A method according to claim 10, wherein step (b) includes the step of transforming the image from the second colour space to a third colour space different from the first and second colour spaces, the third colour space enabling the image to be displayed on a monitor.

13. Apparatus for generating a control data array from an image represented by digital data defining the colour content of pixels of the image in terms of first colour components defining a first colour space, the apparatus comprising first transform means for transforming the image into a second colour space wherein each pixel is defined by second colour components having a reduced resolution relative to those of the first colour space; and means for generating from the reduced resolution version of the image an array of control data having a value corresponding to each image pixel, the control values being generated from the reduced resolution image values in accordance with a predetermined algorithm.

14. Apparatus according to claim 13, adapted to perform a method of generating a control data array from an image represented by digital data defining the colour content of pixels of the image in terms of first colour components defining a first colour space the method comprising
   a) transforming the image into a second colour space different from the first colour space wherein each pixel is defined by second colour components having a reduced resolution relative to those of the first colour space;
   b) generating from the reduced resolution version of the image an array of control data having a value corresponding to each image pixel, the control values being generated from the reduced resolution image values in accordance with a predetermined algorithm.

15. Apparatus for interactively modifying an image represented by digital data defining the colour content of pixels of the image in terms of first colour components defining a first colour space, the apparatus comprising first transform means for transforming the image into a second colour space, the second colour space spanning the entire perceptual colour range, wherein each pixel is defined by second colour components having a reduced resolution relative to those of the first colour space; an input device to enable an operator to modify the representation of the image in the second colour space; a monitor for displaying the modified image; and means for generating a final representation of the image in the first colour space by using the final modification applied to the representation of the image in the second colour space.

16. Apparatus according to claim 15, further comprising second transform means for transforming the image from the second colour space to a third colour space different from the first and second colour spaces, the third colour space enabling the image to be displayed on the monitor.

17. Apparatus according to claim 16, wherein the second transform means comprises a look-up table having addresses corresponding to each of the colours in the second colour space and containing values corresponding to the equivalent colours in the third colour space, the look-up table being connected to the input device to enable the contents of the table to be changed.

* * * * *